US008216354B2

(12) United States Patent
Iftime

(10) Patent No.: US 8,216,354 B2
(45) Date of Patent: Jul. 10, 2012

(54) INVISIBLE INK COMPOSITIONS

(75) Inventor: Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/950,902

(22) Filed: Nov. 19, 2010

(65) Prior Publication Data

US 2012/0125228 A1 May 24, 2012

(51) Int. Cl.
C09D 11/02 (2006.01)
(52) U.S. Cl. ............... 106/31.14; 106/31.25; 106/31.26; 106/31.65; 106/31.32; 106/31.64
(58) Field of Classification Search ............... 106/31.14, 106/31.32, 31.64, 31.65, 31.25, 31.26; 252/301.19, 252/301.21–301.32, 301.34–301.36
See application file for complete search history.

(56) References Cited

U.S. PATENT DOCUMENTS

| 2003/0003278 A1* | 1/2003 | Narita et al. | 428/195 |
| 2008/0220187 A1* | 9/2008 | Iftime et al. | 428/30 |
| 2009/0148787 A1* | 6/2009 | Narita et al. | 430/200 |
| 2009/0200792 A1* | 8/2009 | Iftime et al. | 283/91 |
| 2009/0201321 A1* | 8/2009 | Halfyard et al. | 347/2 |

* cited by examiner

Primary Examiner — Melvin C Mayes
Assistant Examiner — Veronica F Faison
(74) Attorney, Agent, or Firm — Pillsbury Winthrop Shaw Pittman LLP

(57) ABSTRACT

An inkjet ink composition, and in particular, invisible ink printable with an inkjet printing device. The present embodiments provide a water-based invisible ink that can be detected by using a long wavelength ultraviolet (UV) light and is easier and safer to use than other sources used to detect known invisible inks.

18 Claims, 2 Drawing Sheets

INVISIBLE INK COMPOSITIONS

BACKGROUND

The present embodiments relates generally to water-based ink compositions, and in particular, invisible ink printable with an inkjet printing device. The present embodiments provide, in particular, a water-based invisible ink that can be detected by using a long wavelength ultraviolet (UV) light, for example, commonly used black light.

A printhead assembly of an inkjet printer typically includes one or more printheads each having a plurality of ink jets from which drops of liquid ink are ejected towards the recording medium. The ink jets of a printhead receive the liquid ink from an ink supply chamber, or manifold, in the printhead which, in turn, receives ink from a source, such as an ink cartridge. Each ink jet includes a channel having one end connected to the ink supply manifold. The other end of the ink channel has an orifice, or nozzle, for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to each other, the deposited drops can be precisely patterned to form particular text and graphic images on the recording medium.

Recent applications of the above-described printing devices include use with invisible ink technology to print invisible messages on print substrates. For example, U.S. Patent Publication No. 2008/0220187, incorporated herein by reference in its entirety, discloses an invisible ink comprising invisible light-absorbing titania nanoparticles. Prints made with the described ink can be printed with high speed printheads and are invisible under normal light (e.g. 400-780 nm). However, such prints are also undetectable under long wavelength UV light (UV-A) (e.g., 365 nm). The prints can only be detected by exposing the printed area to short wavelength UV light (UV-B) such as, for example, 254 nm. However, light sources at such wavelengths are relatively rare and also present a safety hazard. As such, systems employing such inks are more costly and difficult to implement. For example, systems using the inks would require specialized close box detecting scanners to prevent exposure to the short wavelength UV light.

Therefore, the present embodiments provide a novel invisible ink composition that can be used with an inkjet printing device and which avoids the problems described above.

SUMMARY

The present embodiments provide a water-based inkjet ink composition which is generally invisible and can be only detected by using a long wavelength ultraviolet (UV) light.

In a particular embodiment, there is provided an ink composition, comprising particles further comprising a binder and an ultraviolet light absorbing material dispersed in water, and one or more additives, wherein prints made with the ink composition are invisible under normal viewing conditions but visible at a wavelength of below 400 nm.

In further embodiments, there is provided an ink composition, comprising an emulsion formed from a binder and a light absorbing material dispersed in water, wherein the light absorbing material absorbs light only at wavelengths below 400 nm.

In yet other embodiments, there is provided an ink composition, comprising particles further comprising a binder and an ultraviolet light absorbing material dispersed in water, and one or more additives, wherein the ink composition is invisible under light having a wavelength of 405 nm or more but visible under light a having wavelength of below 400 nm.

BRIEF DESCRIPTION OF THE DRAWINGS

For a better understanding of the present embodiments, reference may be had to the accompanying figures.

DETAILED DESCRIPTION

Figure 1:
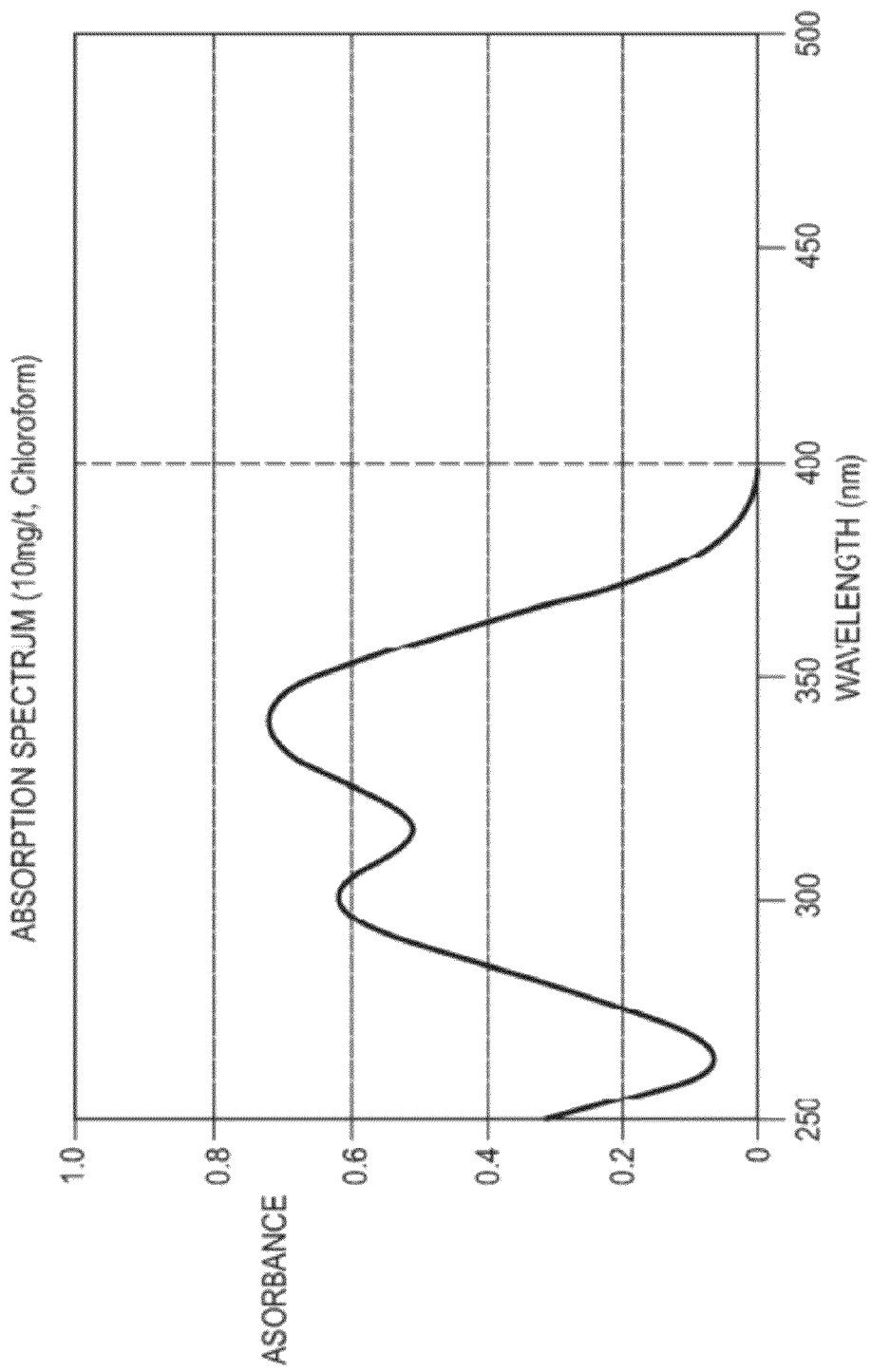
FIG. 1 illustrates a UV/Vis spectrum of an UV absorbing additive according to the present embodiments.

In the following description, it is understood that other embodiments may be utilized and structural and operational changes may be made without departure from the scope of the present embodiments disclosed herein.

Inkjet technology broadens printing capability and customer base across many markets, and the diversity of printing applications will be facilitated by effective integration of printhead technology, print process and ink materials. Use of invisible inks with this technology provides even more options for printing applications.

The present embodiments provide a water-based invisible ink, printable with an inkjet printer, that is detectable by using a long wavelength ultraviolet (UV) light. Long wavelength UV light is also known as black light, a widely accepted source by users. For example, black light is often used by retail stores to authenticate money. Thus, in embodiments, the ink is invisible to a naked human eye under light having wavelengths of 405 nm or more but visible to a naked human eye under light having wavelengths below 400 nm. In the present embodiments, the ink composition comprises a binder resin and an UV light absorbing additive which absorbs at the detecting wavelength (e.g., 365 nm), and provides the desired contrast between printed and blank areas of the print substrate.

Examples of the light absorbing material include organic molecules such as, for example, hydroxybenzophenones, hydroxybenzotriazoles, oxanilides, triazines and hindered amine light stabilizers. An example hydroxyphenyl benzotriazole is TINUVIN P, available from CIBA (now part of BASF, Florham Park, N.J.), which absorbs light at wavelengths below 400 nm, but does not absorb at wavelengths higher than 400 nm. In other specific embodiments, the UV-light absorbing additive used is or 2-(2H-benzotriazol-2-yl)-p-cresol, also available from CIBA. Other solvent soluble UV absorbing materials that can be used include other hydroxyphenyl substituted benzotriazoles like other TINUVIN materials available from CIBA. Examples include TINUVIN 123, 326, 171, 234, 328, 2-(2-hydroxy-3,5-di(1,1-dimethylbenzyl))-2H-benzotriazole commercialized as LOWILITE 234 by the Great Lakes Chemical Corporation. Other benzotriazoles include LOWILITE 26, 27, 28, 29 and 35 all available from the Great Lakes Chemical Company, and the like and mixtures thereof. Other suitable materials are hydroxyphenyl substituted triazines like bis-ethylhexyloxyphenol methoxyphenyl triazine) marketed as Tinosorb S by BASF; substituted cinnamates like Octyl methoxycinnamate available under the trade name of Tinosorb OMC; substituted benzophenone materials like for example, 2-hydroxy-4-methoxybenzophenone, commercialized under the name of LOWILITE 20 by the Great Lakes Chemical Corporation in Michigan, USA, currently part of Chemtura Corporation. These UV absorbers are widely used as protective additives for plastics to prevent yellowing due to exposure to sunlight.

The binder material generally may include oligomeric or polymeric materials, and may be used as long as the binder material also does not absorb light having a wavelength of more than 405 nm. Typical binder material do not absorb light having a wavelength of more than 300 nm or more than 255 nm. Because of this; binder materials alone are not detectable under normal or black light conditions.

The binder may be composed of one, two, three or more different binders. When two or more different binders are present, each binder may be present in an equal or unequal amount by weight ranging, for example, from about 5% to 90%, such as from about 30% to about 50%, based on the weight of all binders.

In the present embodiments, the binder may be selected from the group consisting of amorphous polyesters, such as for example, linear or branched amorphous polyesters. The linear amorphous polyester resins are generally prepared by the polycondensation of an organic diol and a diacid or diester, and a polycondensation catalyst. For the branched amorphous polyester resin, the same materials may be used, with the further inclusion of a branching agent such as a multivalent polyacid or polyol. Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester are selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected can vary, and more specifically, is, for example, from about 45 to about 52 mole percent of the resin.

Branching agents for use in forming the branched amorphous polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Examples of suitable binder materials include, for example, polyacrylates or polymethacrylates such as polymethyl methacrylate, polystyrenes, and polyolefins such as polyethylene, which do not absorb at wavelengths higher than 250 nm. Additional suitable binder materials include polycarbonates, polysulfones, polyethersulfones, polyarylsulfones, polyarylethers, polyvinyl derivatives, cellulose derivatives, polyurethanes, polyamides, polyimides, polyesters, silicone resins, epoxy resins and the like. Copolymer materials such as polystyrene-acrylonitrile, polyethylene-acrylate, vinylidenechloride-vinylchloride, vinylacetatevinylidene chloride, and styrene-alkyd resins are also examples of suitable binder materials. The copolymers may be block, random, or alternating copolymers.

Examples of other suitable resins include, for example, a polymer selected from poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid), poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), combinations thereof and the like. The resins may also be functionalized, such as carboxylated, sulfonated, or the like, and particularly such as sodio sulfonated, if desired, and mixtures thereof. The binder is present in the ink composition in an amount of from about 1 to about 99%, or from about 1 to about 70%, or from about 1 to about 90%, or from about 10 to about 70% by weight of the total weight of the ink composition.

In embodiments, the ink composition may also include other components such as humectants, surfactants, viscosity-controlling additives, and the like. The remaining balance of the composition to 100% is water. The humectant may be selected from the group consisting of ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as amino alcohols, and mixtures thereof. The surfactant may be selected from the group consisting of cationic, anionic and nonionic surfactants. Suitable examples include polyoxyethylene alkyl ether; polyoxyethylene sorbitol monostearate, polyoxyethylene oleyl ether, polyoxyethylene stearyl ether. Specific examples include: Triton (available from Rohm and Haas); Tamol SN and LG, Igepal (available from GAF Company), Pluronic F-68 (available from BASF), and mixtures thereof. The viscosity controlling agent may be selected from the group consisting of water soluble polymers such as Gum Arabic, polyacrylate salts, polymethacrylate salts, polyvinyl alcohols, polyethylene oxides, poyethylene glycols, polypropylene glycols, hydroxy propylcellulose, hydroxyethylcellulose, polyvinylpyrrolidinone, polyvinylether, starch, polyacrylamide, lignin sulfonate salts, copolymers of naphthalene sulfonate salts and formaldehyde, polysaccharides, cellulose, glycerol, and mixtures thereof. In embodiments, the ink has a viscosity of from about 1.5 cp to about 15 cp at the jetting temperature. For example, typical jetting temperatures of water-based inkjet inks range from about 25° C. to about 70° C. or from about 25° C. to about 50° C. or from about 30° C. to about 50° C. In one specific embodiment, the jetting temperature is about 35° C. The one or more additives is present in the ink composition in an amount of from about 0.01 to about 60%, or from about 0.1 to about 50% by weight of the total weight of the ink composition.

The ink of the present embodiments is made by first providing an emulsion made of particles containing the UV-light absorbing additive into a polymer binder dispersed in water. In this manner, the generally non-water soluble Tinuvin P is made "soluble" via an emulsion and the addition of the Tinuvin P in conjunction with titania nanoparticles allow for the use of the safer blacklight (UV-A) rather than the more dangerous UV-B light. Moreover, the water-based emulsion provides a green alternative to solvent-based inks. In embodiments, the emulsion has an average particle size of from about 50 to about 300 nm, or from about 100 to about 250 nm.

In embodiments, the emulsion has a solid contents of from about 0.1 to about 90%, such as from about 0.1 to about 70% by weight, or from about 10 to about 60% by weight, or from about 0.3 to about 50% by weight, of the marking material. The amount of the water employed in the ink or marking material may be, for example, from about 30 to about 99.9%, for example from abut 50 to about 99%, by weight of the total weight of the ink or marking material.

The light absorbing material is present in the ink composition in an amount of from about 0.01 to about 50 percent by weight of the total weight of the ink composition. The light absorbing material may be further included in the ink in an amount of from, for example, about 0.1% to about 40% by weight, from about 1% to about 25% by weight or from about 2% to about 10% by weight, of the ink composition. The image is desirably formed by printing, for example by ink jetting or any other suitable method for applying a marking material to a substrate, a marking material comprising the binder and the light absorbing material. In embodiments, the liquid marking material is water-based, with the binder and light absorbing material dispersed in the liquid marking material containing optional additives.

As the ink of the present embodiments can be readily detected by long wavelength UV light, common black light sources can be used without the risk of exposure to hazardous short wavelength UV light. Thus, systems using the ink are less costly, safer and easier to implement. The ink of the present embodiments, for example, can be used with an inkjet annotator in-line with a xerographic or inkjet machine for printing invisible codes usable either for security or paper tracking which results in improved printing workflow.

The substrate employed can be any appropriate substrate containing some optical brightener additive, depending upon the end use of the print. Exemplary substrates include, but are not limited to, plain paper, coated paper, plastics, polymeric films, treated cellulosics, wood, xerographic substrates, ceramics, fibers, metals and mixtures thereof, optionally comprising additives coated thereon.

The portion of the image printed onto the paper substrate that includes the information substantially not detectable to the naked human eye under normal light conditions is comprised of at least a binder and light absorbing material that absorbs light only at wavelengths below 400 nm. Of course, the document can, and most typically will, include other visible images (that is, visible to a naked human eye under normal visible light conditions, for example visible at wavelengths of light of 405 nm or more) in addition to the hidden text images.

As the light absorbing material that absorbs light only at wavelengths below 400 nm, any absorbing material that absorbs light at wavelengths below 400 nm, or preferably from about 300 to about 400 nm, from about 350 to about 380 nm, may be used. 365 nm represents black light, and thus it is desired that the light absorbing material absorbs light near this wavelength of light. The light absorbing material, which may be organic or inorganic, is also desirably colorless so as not to be detectable to a naked human eye under normal light conditions. The light absorbing material is desirably not fluorescent.

The light absorbing material of the present embodiments may also include a combination of organic molecules, such as TINUVIN P, with inorganic light absorbing materials like inorganic nanoparticles. In such embodiments, emulsion particles may be obtained by dispersing the light absorbing material and inorganic nanoparticles in the binder materials. In such embodiments, the ink composition may have a ratio of the long wavelength ultraviolet light absorbing materials to the inorganic nanoparticles of from about 1:100 to about 100:1.

The nanoparticles may have an average particle size of about 300 nm or less, for example of from about 1 nm to about 300 nm or from about 10 nm to about 200 nm. The average size of the nanoparticles may be determined via any suitable technique and device, for example via use of a Malvern Zetasizer, a Brookhaven nanosize particle analyzer or similar device. Examples of inorganic nanoparticles include, for example, titanium dioxide, aluminum oxide, silicon dioxide, zinc oxide, combinations thereof and the like. These inorganic materials must be of the nanoparticle size in order for the material to be transparent to the naked human eye. A size above 300 nm makes titania appear white, which is not desirable as there may be a detectable difference in white color between the nanoparticles and the paper substrate.

The nanoparticles may be commercially available, for example from Sigma-Aldrich. Alternatively synthetic procedures for making nanoparticles have been reported in the literature. For example, titanium dioxide nanoparticles may be obtained by hydrolysis of titanium tetrachloride in aqueous hydrochloric acid solution. Another procedure starts from tetrabutyl titanate that is hydrolyzed in anhydrous ethanol in the presence of hydrochloric acid as a catalyst. Zinc oxide may be obtained starting from zinc chloride powder.

The nanoparticles may need to be functionalized in order to be dispersible in the marking material composition. Suitable functional groups present on the surface of the nanoparticles for compatibility with binder marking material vehicles may include, for example, long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include esters, ethers, amides, carbonates and the like. A review on the subject of surface functionalizing inorganic particles may be found in Kohji Yoshinaga, Ch. 12.1, Surface modification of inorganic particles, in Surfactant Science Series (2000), p. 626-646.

A method of forming the documents having the at least one image on a paper substrate that is substantially not detectable to a naked human eye through exposure to light having wavelengths of 400 nm or more includes providing a paper substrate as discussed above and forming the at least one image on the paper with the liquid marking material discussed above. Again, the formation of the image may be done via any suitable marking procedure in the art. Prior to the curing or drying of the marking material, which results in substantially complete to complete removal of the liquid vehicle from the paper substrate, the liquid marking material penetrates into the paper substrate.

For detection, the document must be exposed to light having a wavelength at which the light absorbing material absorbs, which light is below 400 nm as described above. An authorized holder of the document will know the wavelength of the light for this absorption, and may possess equipment designed to emit only this specific wavelength of light (although such is not necessary). Exposure of the document to the wavelength of light at which the light absorbing material absorbs light will result in the image becoming visible to the naked human eye. As detailed above, this is because the light absorbing material will absorb the incoming light, creating a differential between the marking and the paper substrate that renders the image visible. Removal of the document from this light condition will result in the image again becoming substantially undetectable to the naked human eye.

As mentioned above, other visible images may be included on the document. The visible and invisible images may share a same portion of the document, or the invisible image portion may be in a separate portion of the document for easy location by an authenticator. Any ink or toner capable of forming visible images on a paper substrate may be used without limitation. The visible and invisible portions of the document may be formed at the same or different times in the creation of the document.

Advantages of the documents and methods described herein thus include that the invisible image formed on the document cannot be viewed at all under normal conditions, meaning, the common indoor and outdoor reading conditions needed to read a normal (visible) printing document with the human eye, such as for example, light in the range of from about 400 to about 800 nm. Other advantages of the embodiments described include that the process is cost effective and does not require encryption, that the image cannot be copied using any presently available equipment or copiers, that the invisible image cannot be easily removed from the paper substrate, and that the wavelengths at which the light absorbing materials absorb light may be tuned to allow customization of the security features for different customers.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Emulsion with UV Absorbing Additive

An organic solution was prepared by heating and mixing at 60° C. the following components: 12 g of an alkoxylated Bisphenol A fumarate/terephthalate amorphous resin and 0.50 g of TINUVIN P (Benzotriazole UV absorber) dissolved in 100 ml of ethyl acetate as a solvent. A second solution was prepared by mixing 0.40 g of DOWFAX 2A1 (dispersant) in 85 g of distilled water. This solution was warmed at 60° C. The water solution was placed in a 1 L kettle and 0.4 g of $NH_4OH$ concentrated were added. The water solution is homogenized while slowly pouring the organic solution. As the viscosity increased, the rpm of the homogenizer was increased from low to highest (at the end of the addition). After completing the addition, the mixture is homogenized for an additional 30 minutes at high rpm. To the kettle is added a distillation column and the organic solvent is distilled away. The lid is removed and the solution is left stirring overnight at room temperature. The emulsion is subsequently filtered through a 25 μm sieve. The emulsion had an average particle size of $d_{50v}$=196 nm and the solid contents was 25.33%.

Preparation of Invisible Ink

An usable ink was prepared by mixing with a shaker at room temperature the following ingredients (the amounts and their role are described in Table 1):

TABLE 1

| Ingredient | Amount | Role |
|---|---|---|
| Emulsion (Example 1) | 5.0 g | Water-based UV light absorbing emulsion |

TABLE 1-continued

| Ingredient | Amount | Role |
|---|---|---|
| Glycerol | 1.5 g | Viscosity control |
| Ethylene Glycol | 0.5 g | Humectant |
| Butyl Carbitol | 0.4 g | Surface tension reduction |

Comparative Example 1

The comparative example was made by preparing a titania nanoparticles-based ink as disclosed in U.S. Patent Publication No. 2008/0220187.

Specifically, functionalized nanoparticle synthesis –40 g of oleic acid was degassed under vacuum at 50° C. and then was heated at 90° C. under argon. 8 mL of titanium tetraisopropoxide (TTIP) was added and allowed to mix for 5 minutes. 8 mL of tetramethylammonium hydroxide (TMAH) was added to the mixture and heating and stirring was continued for 16 hours. The mixture was allowed to cool down to 50° C. Excess water was evaporated under vacuum, and the mixture then cooled to room temperature. The mixture was poured into 300 mL of ethanol in an Erlenmeyer flask. A white solid precipitated immediately. The mixture was centrifuged for 5 minutes at 3,000 rpm, and about 8 g of white solid particles was collected. The particles were dispersible in organic solvents including hexane, ISOPAR and toluene, providing a clear solution in each case. The particles had an average particle size of about 15 nm as measured with a Malvern Zeta-sizer.

To prepare the ink composition, a liquid composition was fabricated by mixing 200 mg of the above titania nanoparticles into 5 ml of a 5% solution of polymethyl methacrylate (PMMA) in toluene. A clear and transparent solution resulted.

Example 2

UV/Vis Absorption Data

The spectrum of TINUVIN P shows strong absorption at the detecting wavelength (365 nm), as shown in FIG. 1. This absorption provides the contrast between written and blank areas, i.e., detectability at 365 nm. Without the UV additive, there would be no absorption at the detecting wavelength and, as a result, no detection (as is the case with titania-based ink).

Detection of Prints Made with Invisible Ink

Text was written with the ink made according to Example 1 by using a pen on white XEROX 4200 paper. A comparative example was made by writing with the titania nanoparticles-based ink made according to Comparative Example 1 on the same substrate.

Figure 2A:
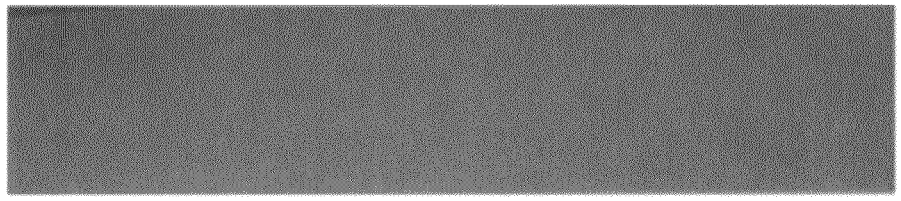
FIG. 2A is a photograph demonstrating detection under long wavelength UV light of text written in titania nanoparticles-based ink.
Figure 2B:
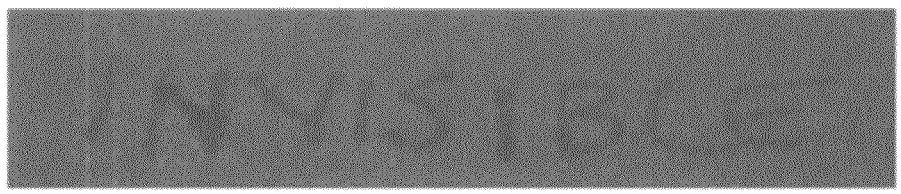
FIG. 2B is a photograph demonstrating detection under long wavelength UV light of text written ink according to the present embodiments.
Figure 3A:
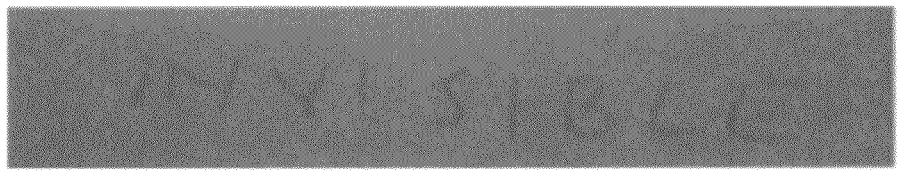
FIG. 3A is a photograph demonstrating detection under short wavelength UV light of text written in titania nanoparticles-based ink.
Figure 3B:
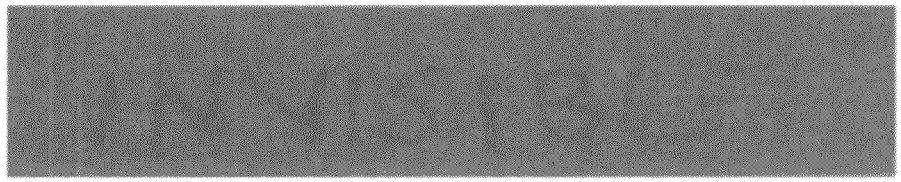
FIG. 3B is a photograph demonstrating detection under short wavelength UV light of text written in ink according to the present embodiments.

Under normal viewing light, both written areas are essentially invisible. FIG. 2 shows the two samples of the text "INVISIBLE" written with ink of Example 1 versus ink of Comparative Example 1 when viewed under exposure to long wavelength UV light (at 365 nm). Only the text written with the invisible ink of the present embodiments (Example 1) is readable. The titania nanoparticles-based sample cannot be read. This thus demonstrates that safe detection with black light sources of the invisible print is made possible by the invisible ink of the present embodiments. Moreover, FIG. 3 shows that both inks are detectable by short wavelength UV light (at 254 nm).

SUMMARY

In summary, the present embodiments provide for water-based invisible ink made from an emulsion containing specific UV absorbing additives which allow for the detection of prints made with the invisible ink with black light sources, which is both easier and safer to use than other sources used to detect known invisible inks.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink composition, comprising:
   particles, further comprising a binder and an ultraviolet light absorbing material, dispersed in water; and
   one or more additives, wherein prints made with the ink composition are invisible under normal viewing conditions but visible at a wavelength of from 350 to 380 nm.

2. The ink composition of claim 1, wherein the one or more additives are selected from the group consisting of a humectant, surfactant, viscosity controlling agent, and mixtures thereof.

3. The ink composition of claim 1, wherein the ultraviolet light absorbing material is selected from the group consisting hydroxyphenyl benzotriazoles, hydroxyphenyl triazines, substituted benzophenones, substituted cinnamates, and mixtures thereof.

4. The ink composition of claim 1, wherein the ultraviolet light absorbing material comprises a combination of long wavelength ultraviolet light absorbing materials and light absorbing inorganic nanoparticles.

5. The ink composition of claim 4, wherein a ratio of the long wavelength ultraviolet light absorbing materials to the inorganic nanoparticles is from about 1:100 to about 100:1.

6. The ink composition of claim 4, wherein the inorganic nanoparticles are selected from the group consisting of titanium dioxide, aluminum oxide, silicon dioxide, zinc oxide, and mixtures thereof.

7. The ink composition of claim 1, wherein the long wavelength ultraviolet light absorbing material is present in the ink composition in an amount of from about 0.01 to about 50 percent by weight of the total weight of the ink composition.

8. The ink composition of claim 1, wherein the binder is present in the ink composition in an amount of from about 1 to about 70 percent by weight of the total weight of the ink composition.

9. The ink composition of claim 1, wherein the one or more additives is present in the ink composition in an amount of from about 0.01 to about 60 percent by weight of the total weight of the ink composition.

10. The ink composition of claim 1, wherein the ink has a viscosity from about 1.5 cp at jetting temperature.

11. The ink composition of claim 1, wherein the ink has a surface tension from about 30 dyne/cm to about 50 dyne/cm.

12. An ink composition, comprising:
    an emulsion formed from a binder and a light absorbing material dispersed in water, wherein the light absorbing material absorbs light only at wavelengths from 350 to 380 nm.

13. The ink composition of claim 12 further having one or more additives that are added to the emulsion and are selected from the group consisting of a humectant, dispersant, viscosity controlling agent, and mixtures thereof.

14. The ink composition of claim 12, wherein the emulsion has an average particle size of from about 50 to about 300 nm.

15. The ink composition of claim 12, wherein the emulsion has a solid contents of from about 10 to about 60 percent.

16. The ink composition of claim 12, wherein the ultraviolet light absorbing material comprises a combination of long wavelength ultraviolet light absorbing materials and inorganic nanoparticles.

17. The ink composition of claim 16, wherein a ratio of the long wavelength ultraviolet light absorbing materials to the inorganic nanoparticles is from about 1:100 to about 100:1.

18. An ink composition, comprising:
    particles, further comprising a binder and an ultraviolet light absorbing material, dispersed in water; and
    one or more additives, wherein the ink composition is invisible under light having a wavelength of 405 nm or more but visible under light a having wavelength of from 350 to 380 nm.

* * * * *